J. B. SARGENT.
VEHICLE HUB LOCKING DEVICE.
APPLICATION FILED JAN. 14, 1916.
1,192,688.
Patented July 25, 1916.
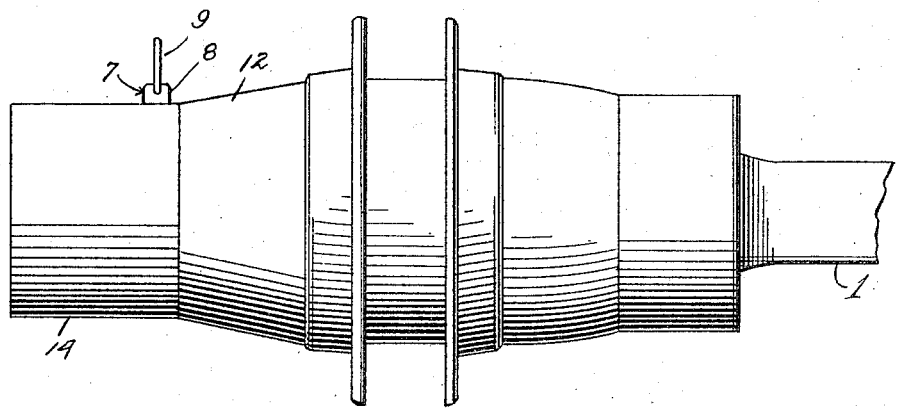
Fig. 1.
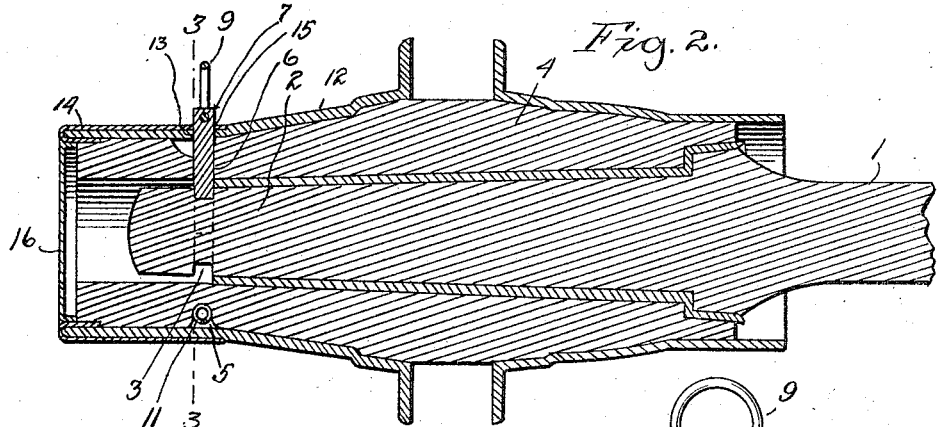
Fig. 2.
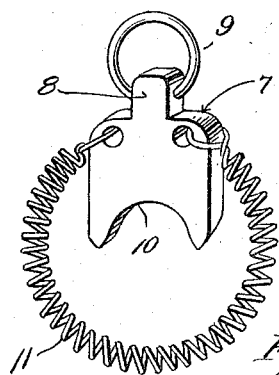
Fig. 3.
Fig. 4.
Inventor
J. B. Sargent
Witnesses
By
Attorneys

UNITED STATES PATENT OFFICE.

JOHN B. SARGENT, OF STATESBORO, GEORGIA.

VEHICLE-HUB-LOCKING DEVICE.

1,192,688.          Specification of Letters Patent.     Patented July 25, 1916.

Application filed January 14, 1916. Serial No. 72,111.

*To all whom it may concern:*

Be it known that I, JOHN B. SARGENT, a citizen of the United States, residing at Statesboro, in the county of Bulloch, State of Georgia, have invented certain new and useful Improvements in Vehicle-Hub-Locking Devices; and I do hereby declare the following to be a full, clear, and exact description of the invention, such as will enable others skilled in the art to which it appertains to make and use the same.

The present invention is directed to improvements in locking devices for vehicle hubs, and has for its object to so construct a device of this character that the hub can be held against accidental displacement from the axle without the use of nuts.

A further object of the invention is to provide a locking device of this type, which is extremely simple in construction and one which will positively hold a hub on the axle, and can be conveniently operated to remove the hub without the use of a wrench or other tool.

With these and other objects in view, this invention resides in the novel features of construction, formation, combination and arrangement of parts to be hereinafter more fully described, claimed and illustrated in the accompanying drawings, in which:—

Figure 1 is a side elevation of the hub. Fig. 2 is a longitudinal sectional view therethrough. Fig. 3 is a sectional view on line 3—3 of Fig. 2. Fig. 4 is a detail perspective view of the latch and associated spring.

Referring to the drawing 1 designates the axle and 2 the spindle thereof, said spindle having an annular groove 3 formed adjacent its outer end, the purpose of which will appear later. The hub 4 is also provided with an annular groove 5 adjacent its outer end and opening into said groove is a slot 6 in which slides the latch 7, said latch having its upper edge provided with a head 8 to which is connected the ring 9, said ring serving to actuate the latch when it is desired to remove the hub from the spindle 2. The lower edge of the latch is curved as at 10 so as to conform to the groove 3 formed in the spindle, and when said latch is engaged in the groove it is obvious that the hub cannot be removed until the latch is raised. A coil spring 11 is seated in the groove 5 of the hub and has its terminals connected to the sides of the latch 7, said spring serving to normally hold the curved edge of the latch yieldably engaged in the groove 3 of the spindle. The hub sleeve 12 is engaged over the hub and has a slot 13 formed therein which registers with the slot 6 of the hub to accommodate the latch 7. A finishing cap 14 is engaged over the sleeve 12 and has an opening 15 formed therein to permit the head 8 of the latch to move upwardly when the ring 9 is grasped and pulled to permit removal of the hub from the spindle. The cap 14 has suitably secured in its outer end a closure 16, which serves to prevent dust and dirt from entering the hub.

What is claimed is:—

In combination with an axle spindle having an annular groove formed adjacent its outer end, a hub rotatably mounted on the spindle, said hub having an annular groove formed adjacent its outer end, said hub being further provided with a slot which opens into the last named groove and coincides with the groove of the spindle, a latch operable in the slot of the hub and adapted to engage the groove of the spindle, a coil spring seated in the groove of the hub and having its terminals connected to the sides of the latch for holding the same in yielding engagement with the groove of the spindle, said latch having a head carried by its upper edge, and a ring pivotally connected in the head, as and for the purpose set forth.

In testimony whereof, I affix my signature in the presence of two witnesses.

JOHN B. SARGENT.

Witnesses:
R. H. ERWIN,
T. J. DENMARK.